United States Patent [19]

Di Renna

[11] 3,896,289
[45] July 22, 1975

[54] AQUARIUM WATER HEATER
[76] Inventor: Edmond F. Di Renna, 60 Lessing Rd., West Orange, N.J. 07052
[22] Filed: Nov. 13, 1974
[21] Appl. No.: 523,346

[52] U.S. Cl. ............... 219/523; 219/501; 219/331
[51] Int. Cl.² .......................................... H05B 3/06
[58] Field of Search .......... 219/316, 318, 328, 331, 219/501, 504, 505, 523

[56] References Cited
UNITED STATES PATENTS

| | | | |
|---|---|---|---|
| 3,467,817 | 9/1969 | Fricker | 219/501 |
| 3,564,589 | 2/1971 | Arak | 219/331 |
| 3,576,426 | 4/1971 | Sesholtz | 219/523 |
| 3,731,058 | 5/1973 | Bleiweiss | 219/523 |
| 3,754,118 | 8/1973 | Booker | 219/523 |
| 3,796,858 | 3/1974 | Cohn | 219/331 |
| 3,803,386 | 4/1974 | Rodrigues | 219/523 |

Primary Examiner—Volodymyr Y. Mayewsky

[57] ABSTRACT

A solid-state immersion-type electric aquarium heater comprising (a) a typical electric heating element, (b) a negative temperature coefficient thermistor, (c) alternating current supply means and (d) a heater element control means comprising (i) a zero voltage switch, (ii) a bi-directional thyristor and (iii) a multi-turn potentiometer are electrically interconnected and maintained within a housing formed of an electrically insulating material to provide a reliable aquarium heater system that is readiy programmable over a specified temperature range.

2 Claims, 3 Drawing Figures

AQUARIUM WATER HEATER

BACKGROUND OF THE INVENTION

1. Field of the Invention

This invention relates to a solid state, home aquarium heater. More particularly, the present invention relates to a solid state, aquarium heater that is programmable over a useful aquarium water temperature range.

2. Description of the Prior Art

Home aquarium heaters are known articles of commerce and have been extensively described in the patent literature. Examples of prior art aquarium heaters are found in U.S. Pat. Nos. 1,334,035; 2,297,030; 3,059,091; 3,107,289; 3,371,192; 3,564,589; 3,576,426; 3,731,058 and 3,796,858. Typically, the prior art aquarium heater is composed of an electrical heater element electrically interconnected to a bimetallic thermostat-switch. With use, the switching contacts of the bimetallic thermostat-switch become eroded and eventually fail, usually without warning. Furthermore, such prior art bimetallic thermostat-switch based devices are characterized by excessive thermal feedback between the heating element and the thermostat-switch. Finally, bimetallic thermostats are typically subjected to line currents and frequently arc which produces undesirable radio and television interference.

Cohn in U.S. Pat. No. 3,796,858 has described a solid state aquarium heater system. Power to the heating element of the Cohn device is controlled by a silicon controlled rectifier (SCR). The use of an SCR serves to reduce the probability of the generation of radio frequency emissions but does not completely eliminate the problem; however, an SCR offers only half-wave conduction and, as a result, the heater coil must be twice as large as a heater coil used when full wave conduction is available. Furthermore, the Cohn system is characterized by the maintenance of a temperature sensing thermistor in relatively close proximity to the heater coil thus increasing the probability of having the thermistor respond to increases in temperature generated by the heater element rather than to changes in temperature of the aquarium water.

SUMMARY OF THE INVENTION

Now, in accordance with the present invention, an improved solid state aquarium heater system is provided. The heater system is composed of five main elements, namely, (a) an electric heater element; (b) a temperature sensing means thermally insulated from the heater element and spaced from said heater element and preferably comprising a negative temperature coefficient thermistor, preferably a thermistor that exhibits a change in electrical resistance with temperature change that is substantially linear with respect to variations in temperature over the temperature range of about 72° to about 86°F.; (c) an alternating current supply means for the heater element; (d) a heater element control means electrically connected to the alternating current supply, the heater element and temperature sensing means and comprising (i) a zero voltage switch (ii) a bi-directional thyristor (triac) and (iii) a multi-turn potentiometer; and (e) a housing formed of a water resistant, electrically insulating material and adapted to receive the heater element and heater element control means and be located within an aquarium, preferably adjacent to the sidewall of an aquarium. The temperature sensing means (thermistor) may be positioned within the housing member but is preferably located outside the housing in a spaced relationship (positioned 2 to 7, preferably 3 to 6, inches from the heater housing and at least 6 inches from the heater element) from the electric heater element and housing member. Such an arrangement decreases the possibility of thermal feedback to the temperature sensing means directly from the electric heater element of the system.

With the present system, the thermistor element of the heater system is employed to sense the temperature of the aquarium water and a zero voltage switch employed to determine when the heater coil of the system needs to operate. The zero voltage switch energizes a triac to control the flow of current to the electric heater element. The power is switched to the electric heater element with the present system only at zero voltage crossings of the power line voltage thus eliminating the generation of radio and television interference. Furthermore, the present system is readily temperature programmable. The inclusion of a multi-turn potentiometer in the heater element control circuit permits the aquarium water temperature to be adjusted upwardly or downwardly by a specified number of degrees per turn of said potentiometer.

BRIEF DESCRIPTION OF THE DRAWINGS

The invention will be more readily understood by reference to the accompanying drawings of a preferred embodiment of the present invention in which.

DETAILED DESCRIPTION OF THE INVENTION

Figure 1:
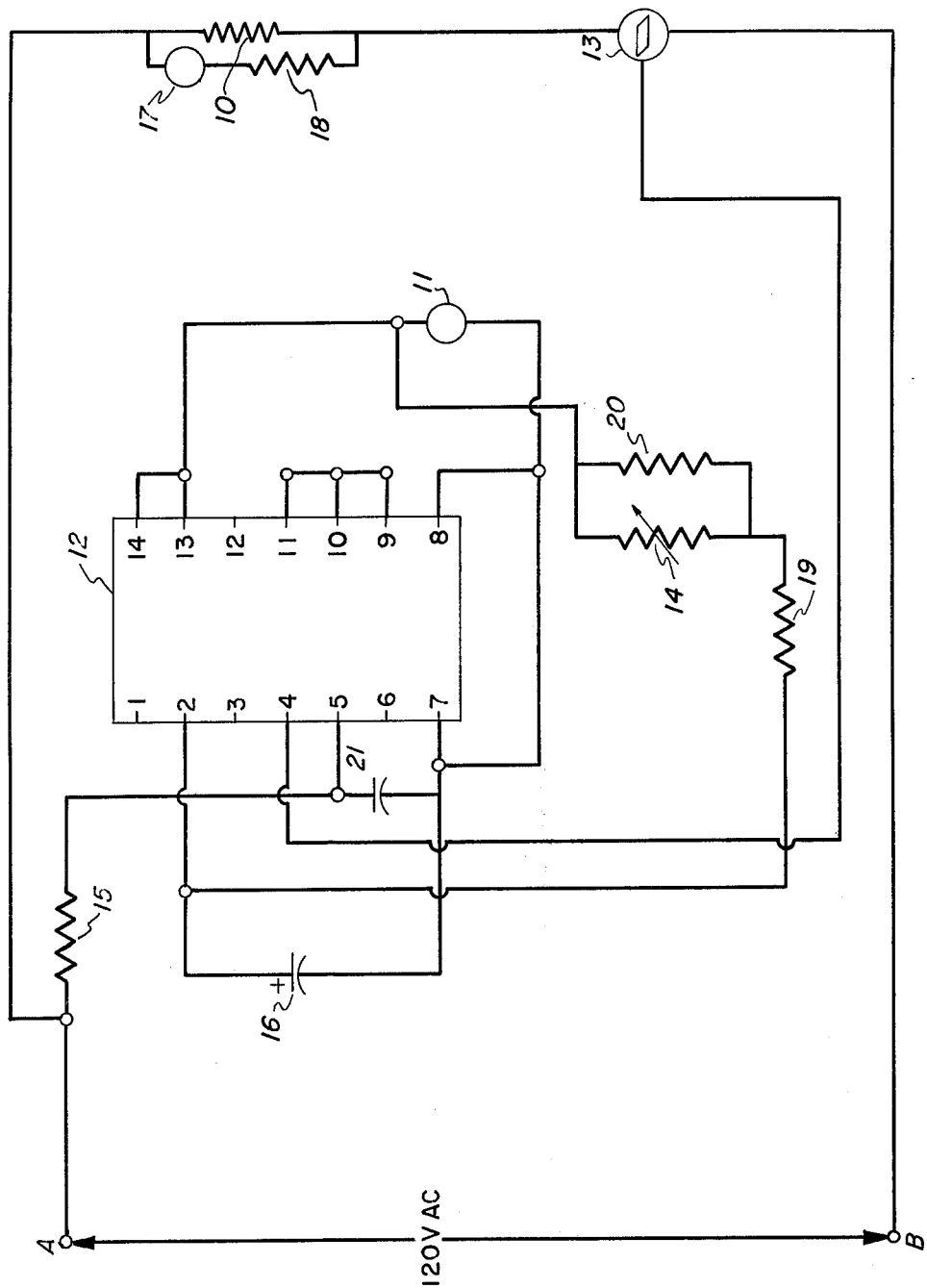
FIG. 1 is a circuit diagram of the electrical components of the system of the present invention.

As shown in FIG. 1, the aquarium heater system is composed of a heater element 10, a negative temperature coefficient thermistor 11, an alternating current supply source located across points A and B of FIG. 1, a heater element control means comprising a zero voltage switch 12, a bi-directional thyristor (triac) 13 and a multi-turn potentiometer 14. The thermistor 11 and potentiometer 14 are electrically connected in series in a circuit that is adapted to provide a voltage V to the zero voltage switch 12 at pin 13. The zero voltage switch 12 is operable responsive to the voltage V and it is adapted to electrically actuate the triac 13. As is evident from FIG. 1, triac 13 is located in the circuit to permit or halt the flow of all current to the heater element 10.

Various types of zero voltage switches may be employed in the instant electric heater aquarium system. A particularly useful device, which will be described in more detail hereafter, is the RCA model CA 3079 integrated circuit. In use, the aquarium heater system functions as follows. The zero voltage switch 12, through resistor 15 and capacitor 16 creates a 6-volt direct current supply from the alternating current supply means. Interconnecting pins 9, 10 and 11 of the zero voltage switch 12 biases one-half of an internal differential amplifier of the zero voltage switch 12 to a constant reference voltage of approximately 3.0 volts. Pins 1, 3, 6 and 12 of the zero voltage switch 12 are not electrically connected. When a voltage V from the circuit containing the thermistor 11 and potentiometer 14 (the circuit being connected to the other half of the differential amplifier of the zero voltage switch 12) exceeds the reference voltage, the zero voltage switch 12 will activate triac 13 which will permit the heater coil 10 to be energized and thus heat the water contained in the aquarium. When voltage V from the thermistor/potentiometer circuit is less than the reference voltage, the triac is maintained in an off position. The on-off switching is done only at zero voltage crossings of the alternating current power line thus eliminating completely radio frequency interference.

Optionally, a neon bulb indicator 17 and appropriate resistor 18 are located in parallel with heater 10 to provide a visual indication when the heater is operating. Resistor 19 is essentially a temperature limiting resistor and is needed when potentiometer 14 is set at a minimum resistance level to assure that the equilibrium temperature of the aquarium water will have finite upper limit. Resistor 20 of the aquarium heater circuit is an optional trimmer resistor having a resistance value substantially greater than that of potentiometer 14. The resistance value of resistor 20 is chosen such that the temperature of the aquarium water bath will change by a convenient number of degrees per turn of the multi-turn potentiometer 14. Capacitor 21 is used to assist in firing the triac from the zero voltage switch.

Figure 2:
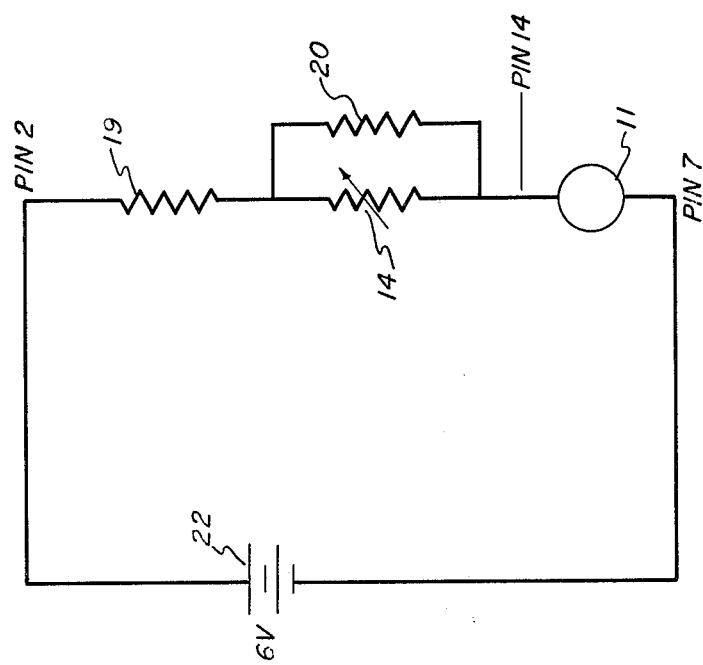
FIG. 2 is a circuit diagram of the potentiometer-thermistor control network of the heater element control means of the present invention.

The control circuit employed to maintain desired aquarium water temperature level is depicted in more detail in FIG. 2. The essential elements of the control circuit are thermistor 11 and the multi-turn potentiometer 14. Preferably, the potentiometer is a 20-turn device. As noted earlier, the thermistor is preferably a negative temperature coefficient device. Although thermistors are normally highly non-linear devices, it is necessary that the thermistor employed in the aquarium heater system of the present invention be essentially linear over the temperature range of interest, that is, the change in electrical resistance ($\Delta R$) exhibited by the thermistor over the temperature range of about 72° to about 86°F. should be substantially linear with respect to variations in temperature ($\Delta T$) over the specified range. ($\Delta R = -K\Delta T$). The thermistor is preferably a Victory Engineering Model 35D6. Depending upon the setting on control potentiometer 14, voltage V, which is the input to the other half of the differential amplifier of the integrated circuit 12 will be somewhere between 0 and 6 volts. If the potentiometer 14 is set so that V is greater than about 3 volts, the zero voltage switch will turn the triac to the "on" position and the heating coil will be energized. As the water in the aquarium is heated to desired temperature, the electrical resistance of the thermistor will decrease and thus voltage V will decrease. When the temperature of the aquarium water is such that the electrical resistance of thermistor 11 falls to a point at which V is less than the reference voltage, the zero voltage switch 12 turns the triac 13 to the "off" position and electrical power flow to the heating coil 10 is halted thus completing the negative feedback cycle.

If the aquarium water is at some equilibrium temperature and control potentiometer 14 resistance is decreased, the voltage V will fall below the reference voltage and the heater coil will remain in an off position. Depending upon the ambient temperature, the aquarium water will begin to cool and the thermistor resistance will again increase. When the temperature falls to a point at which the thermistor resistance is large enough to cause voltage V to be greater than the reference voltage, the zero voltage switch will again actuate the triac 13 to permit the flow of current to heater coil 10 to thereby maintain a new equilibrium temperature. In FIG. 2, reference numeral 22 designates a 6-volt direct current source. As stated previously, the zero voltage switch generates a constant 6-volt power supply from the 120 volt alternating current power supply. For convenience, FIG. 2 also indicates the pin connection points of the control circuit to the zero voltage switch 12.

Figure 3:
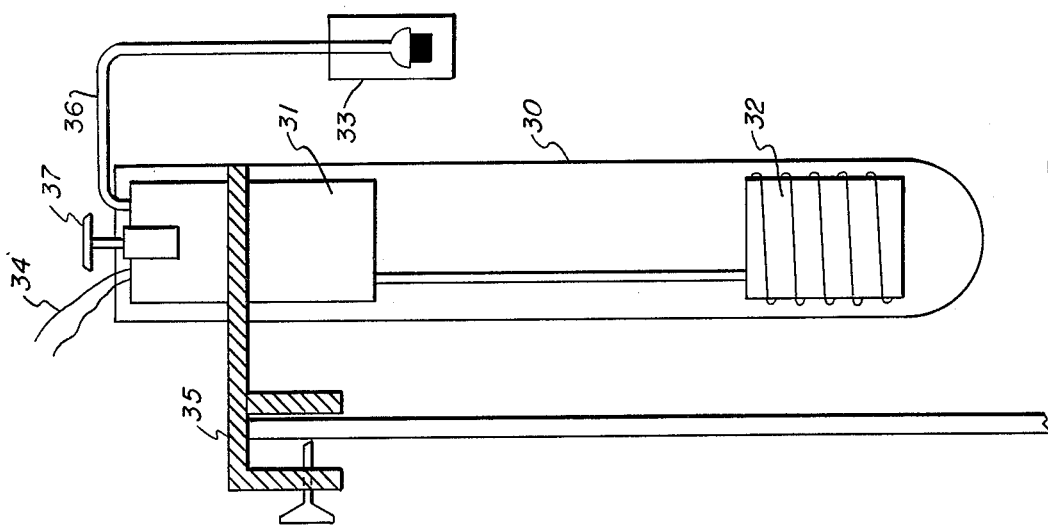
FIG. 3 is a view of an embodiment of the aquarium heater in accordance with the present invention.

FIG. 3 illustrates a physical embodiment of the aquarium heater system of the present invention. In brief, the aquarium heater consists of a housing means 30, control circuit board 31, heater coil 32, thermistor assembly 33 and alternating current supply leads 34. The housing is preferably formed of an electrically insulating, thermally conducting material. The control circuitry and heater coil are positioned within housing 30 and thermistor assembly 33 is located in a spaced relationship from the heater coil in the housing means. Housing 30 is adapted to be positioned within an aquarium utilizing any of the connecting systems known to those skilled in the art. A clamp-screw arrangement 35 may be used. Placing the thermistor assembly 33 at a substantial distance away from heater coil 32 eliminates thermal feedback from the heater 32. Preferably, the thermistor is soldered to connecting wires 36 close to the thermistor body and the thermistor and solder joints are placed in a small tube which is potted in silicon rubber or other suitable water resistant insulating material. Wires 35 are passed to the control circuit board 31 and electrically connected as indicated previously. Desirably, the thermistor of thermistor assembly 33 is located within a thermal insulating material since the use of such a composition makes the thermistor less sensitive to short term water temperature fluctuations. Thermistor assembly 33 can be mounted on the aquarium wall at a spaced point from the heater element by means of a suction cup or similar device. Utilizing this arrangement will permit the thermistor to monitor water temperature independent of feedback from the heater coil 32. Finally, the resistance of the potentiometer is varied from turning the control knob 37 which is mechanically interconnected with the potentiometer of the heater element control system.

What is claimed is:

1. An immersion-type electric aquarium heater comprising:
   a. an electric heater element;
   b. temperature sensing means located at a spaced point from said heater element and thermally insulated therefrom and comprising a negative temperature coefficient thermistor, the change in electrical resistance exhibited by said thermistor over the temperature range of about 72° to about 86°F. being substantially linear with respect to variations in temperature over said temperature range;
   c. alternating current supply means for said heater element;
   d. heater element control means electrically connected to said alternating current supply means, said heater element and said temperature sensing means and comprising (i) a zero voltage switch, (ii) a bi-directional thyristor and (iii) a multi-turn potentiometer, said temperature sensing means and potentiometer connected in series in a circuit that is adapted to provide a voltage V to said zero voltage switch, said zero voltage switch operable responsive to said voltage V and adapted to electrically actuate said thyristor, said thyristor adapted to permit or halt the flow of alternating current to said heater element; and e. housing means formed of an electrical insulating material and adapted to receive said heater element and heater element control means and be positioned within an aquarium.

2. The apparatus of claim 1 wherein said temperature sensing means is encased within a thermal insulating material and adapted to be located from about 2 to 7 inches from said housing means and at least 6 inches from said electric heater element.

* * * * *